United States Patent [19]
Stickle

[11] 3,948,160

[45] *Apr. 6, 1976

[54] MULTIFOOD PRODUCT FRYING MACHINE

[76] Inventor: Daniel T. Stickle, 310 E. 40th St., Lubbock, Tex. 79404

[ * ] Notice: The portion of the term of this patent subsequent to Jan. 15, 1991, has been disclaimed.

[22] Filed: Feb. 18, 1975

[21] Appl. No.: 550,528

Related U.S. Application Data

[60] Continuation-in-part of Ser. No. 390,164, Aug. 20, 1973, which is a division of Ser. No. 222,493, Feb. 1, 1972, Pat. No. 3,785,273.

[52] U.S. Cl. .................... 99/404; 99/353; 99/427; 99/443 C
[51] Int. Cl.² .......................................... A47J 37/12
[58] Field of Search ............ 99/404, 353, 386, 403, 99/411, 413, 416, 426–427, 443; 198/110, 113, 116, 135, 196; 426/145, 343, 345, 347, 404, 439

[56] References Cited
UNITED STATES PATENTS

| | | |
|---|---|---|
| 1,919,185 | 7/1933 | Chapman.............................. 99/404 |
| 3,608,474 | 9/1971 | Liepa................................... 99/353 |
| 3,667,372 | 6/1972 | Hilvitz et al. ......................... 99/404 |
| 3,766,846 | 10/1973 | Jimenez............................... 99/404 |

*Primary Examiner*—Stanley N. Gilreath
*Assistant Examiner*—Arthur O. Henderson
*Attorney, Agent, or Firm*—Christie, Parker & Hale

[57] ABSTRACT

Tortillas are placed on a flexible, pliable, perforated web made of woven metal. A plunger folds over the tortilla, folding the tortilla and the metal web, and the combination wherein the tortilla is fried crisp in the folded position, thus forming it into a taco shell. Thereafter the plunger with the taco shell thereon is unfolded from the metal web and the fat drained and shaken from the shell and the shell dropped from the plunger.

In an alternative embodiment the flexible web is replaced by rigid grids hinged to fold in the center, the folded grids being closely packed together as they move through the cooking oil.

14 Claims, 13 Drawing Figures

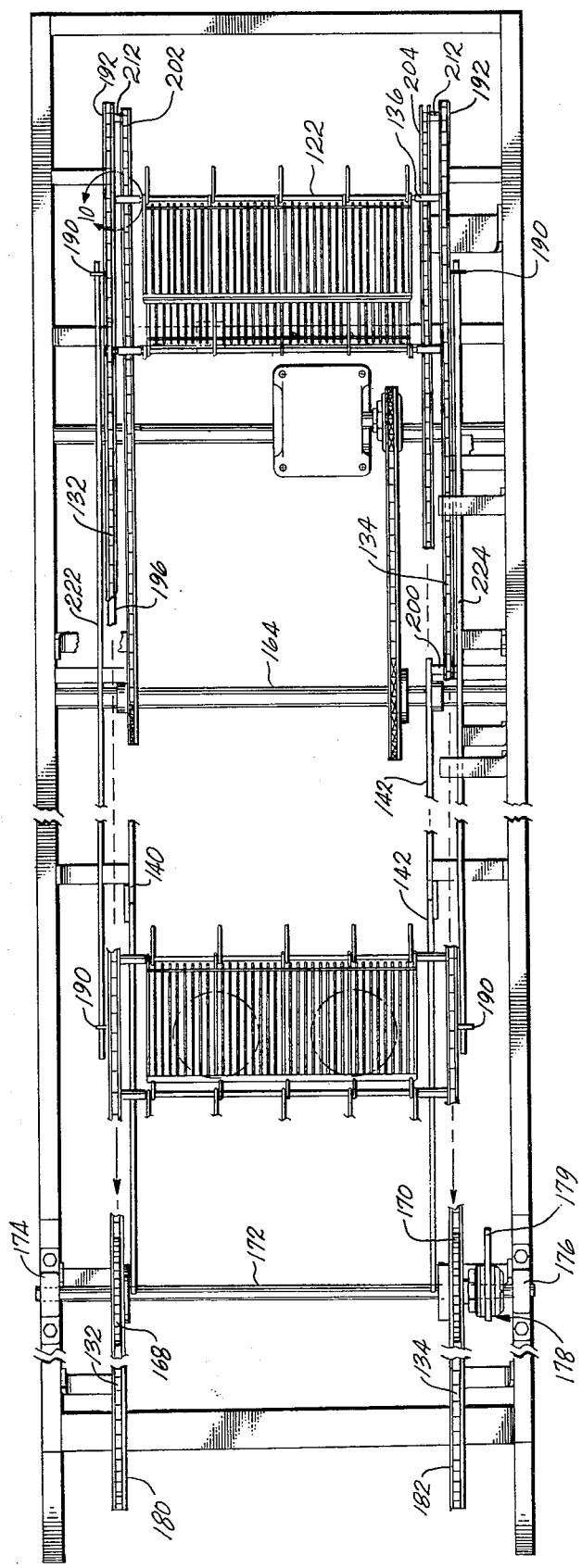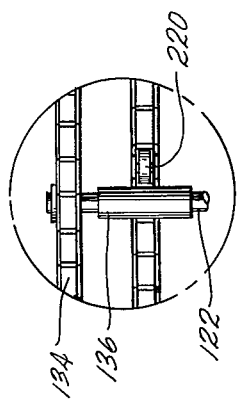

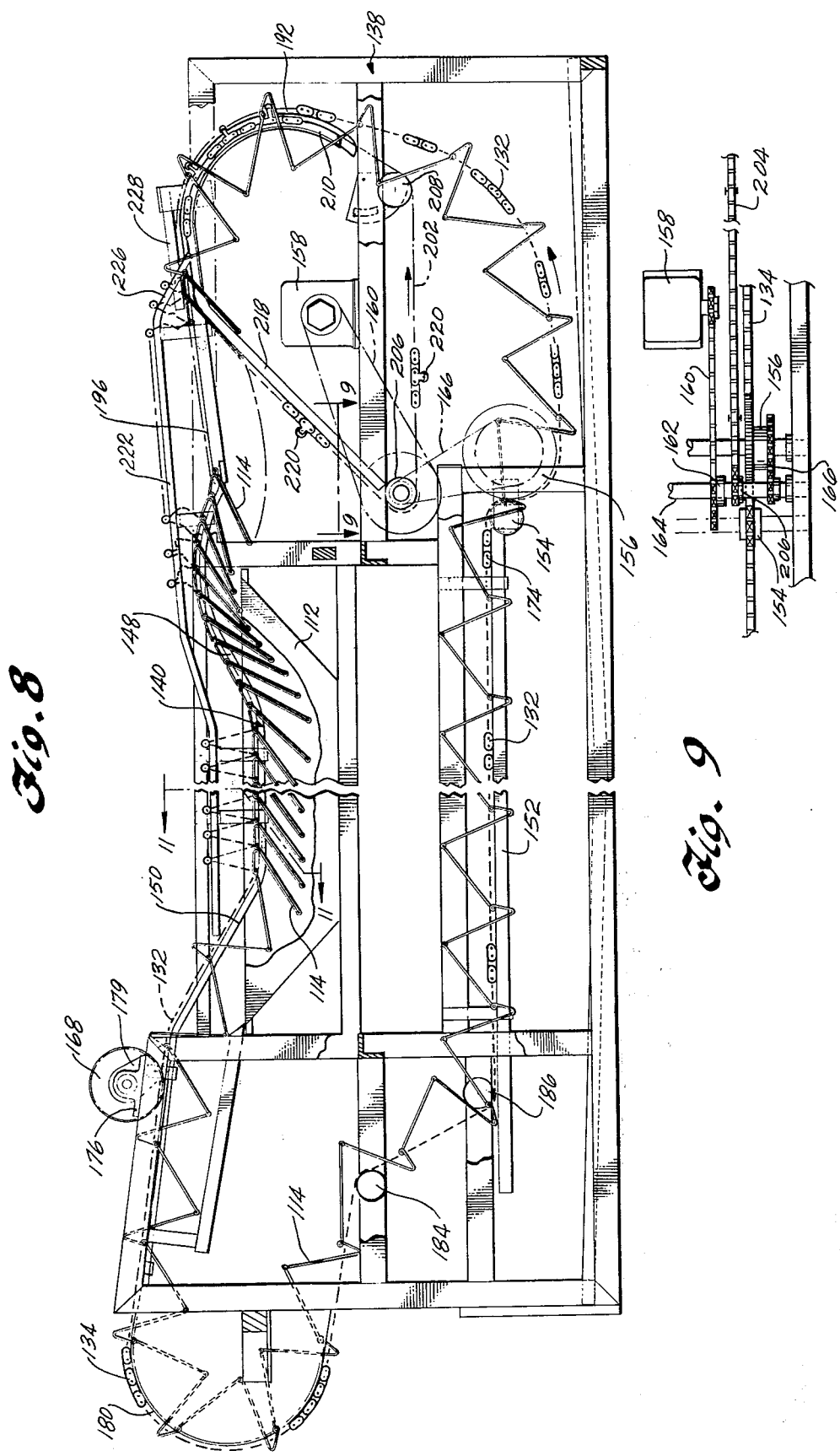

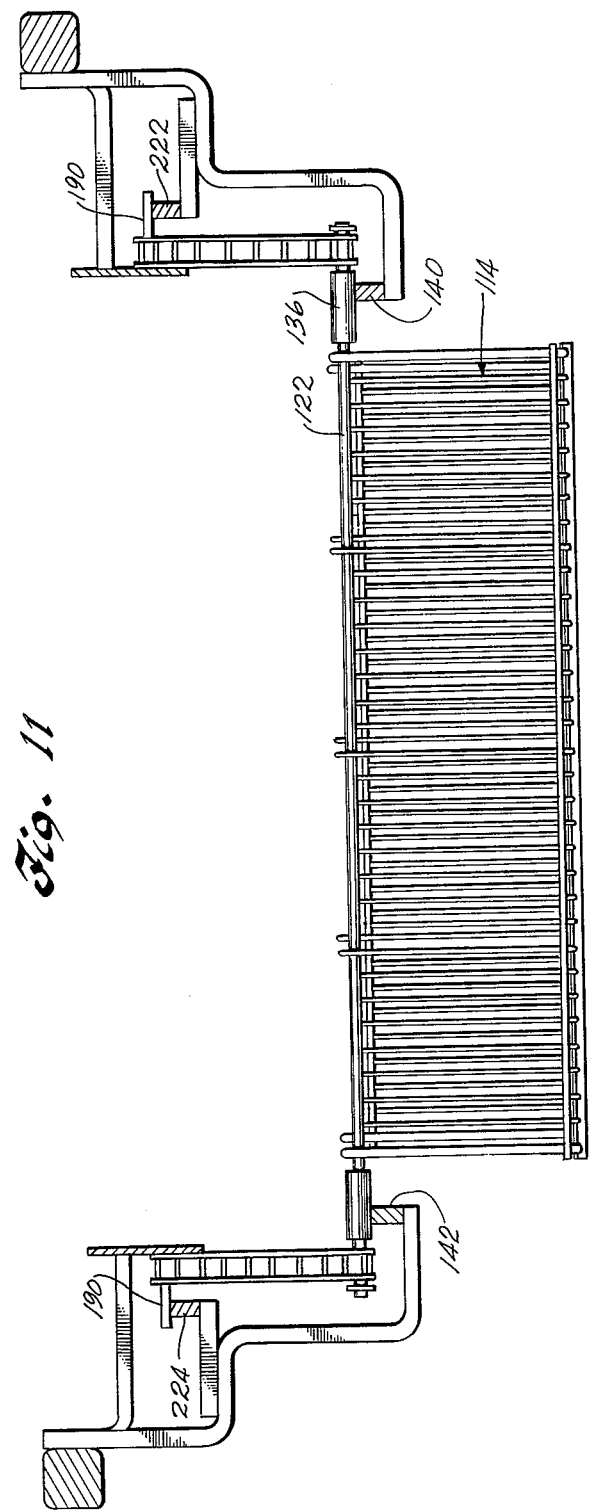

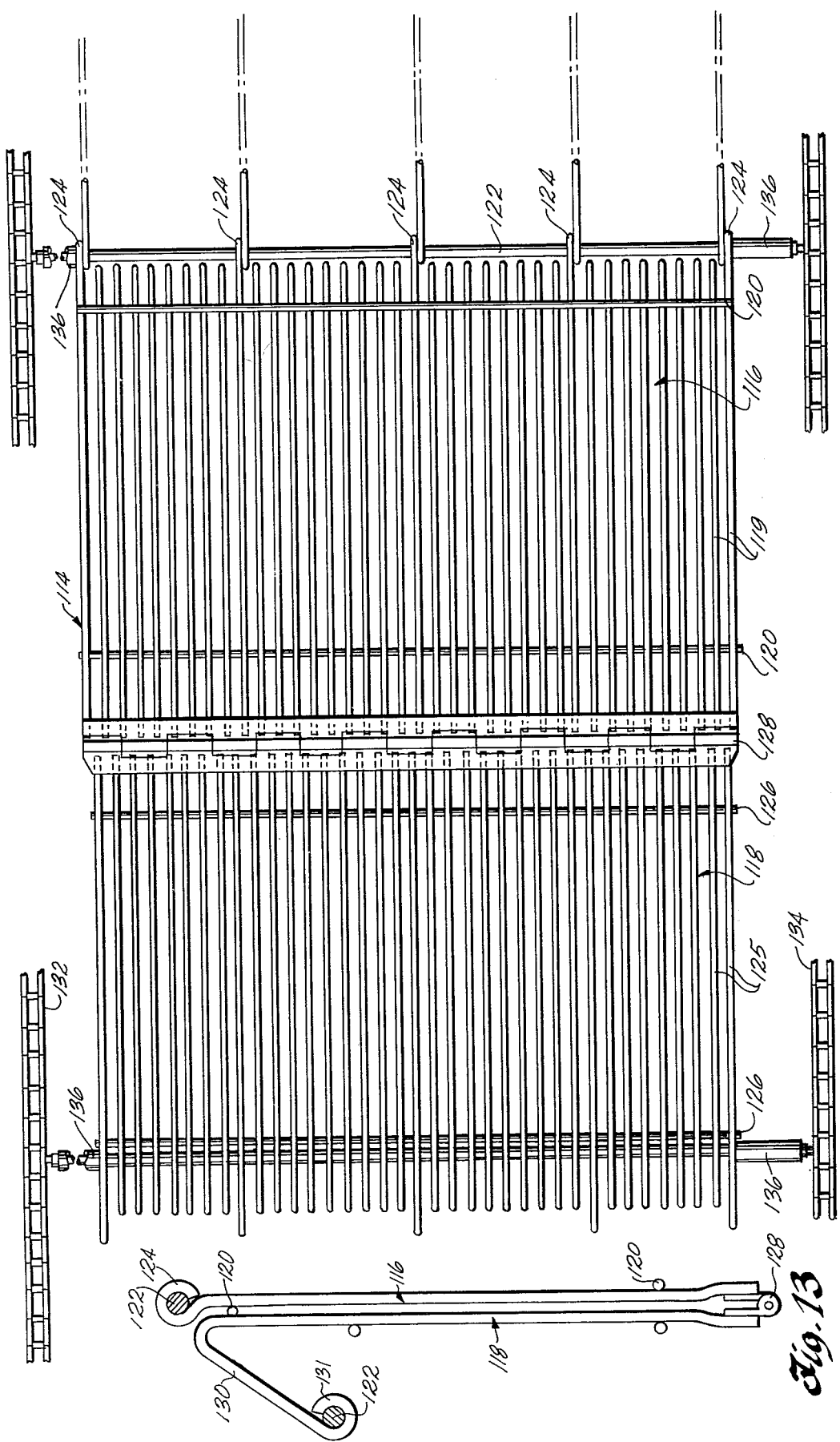

MULTIFOOD PRODUCT FRYING MACHINE

RELATED CASES

This application is a continuation-in-part of application Ser. No. 390,164 filed Aug. 20, 1973, which application is a divisional application Ser. No. 222,493 filed Feb. 1, 1972 and issued as U.S. Pat. No. 3,785,273 on Jan. 15, 1974.

BACKGROUND OF THE INVENTION

1. Field of the Invention

This invention relates to a cooking apparatus of a deep-fat type with a conveyor, including a plural food molding support with a final elevated draining position.

2. Description of the Prior Art

A popular Mexican food is the taco. The taco is made by folding and frying a tortilla and then filling the taco shell with meat, cheese, vegetables, sauces, etc., according to taste and the availability of ingredients.

Taco shells were originally made by hand somewhat as described by POMPA, U.S. Pat. No. 2,570,374. POMPA discloses a simple frame for forming and frying a plurality of taco shells at a time.

SAENZ, U.S. Pat. No. 2,603,143, discloses a machine for forming and frying the shell as it moves through a machine. As applicant understands the SAENZ disclosure, the shell is formed by pulling it through a throat while it is still plastic or pliable.

YEPIS, U.S. Pat. No. 3,627,836, discloses a plurality of individual V-shaped molds of rigid character wherein the tortilla is folded thereover to form the taco shell.

In both SAENZ and YEPIS, the tortillas are carried by a chain conveyor through a deep-fat frying vat.

SCHY, U.S. Pat. No. 3,570,393, discloses dual sets of rigid plates mounted on chain conveyors which form the taco by folding the plates with the tortilla between them.

PEREZ, U.S. Pat. No. 3,602,130, discloses a plurality of rigid plates mounted on chain conveyors which move from a Y-shape to a V-shape to form the taco.

SANTILLAN, U.S. Pat. No. 2,112,309; CONTRERAS, U.S. Pat. No. 2,773,442; and HAYES, U.S. Pat. No. 3,467,029, also are of interest.

SUMMARY OF THE INVENTION

1. New and Different Function

This invention forms the taco shell from the tortilla by having the tortilla placed upon the flexible, pliable web made of woven wire, and then folding the web with the tortilla thereon over a plunger to shape the tortilla. After the tortilla is formed, it is fried, then taken from the hot grease and flipped off the plunger to be packed.

In an alternative arrangement the tortilla is held in a rigid grid which is hinged in the center so that it folds up and clamps the tortilla in a flat position between the two halves of the folded grid to fry the tortilla in a flat condition, e.g., a chalupa. Whether a flexible web or a rigid hinged grid is used to hold the tortilla, the folding action enables the tortillas to be held tightly packed in side-by-side relationship as they move through the cooking oil.

2. Objects of the Invention

An object of this invention is to fry a crisp, edible product.

Another object of this invention is to form and fry a taco shell.

Another object is to drain all excess grease from the fried taco shell.

Further objects are to achieve the above with a device that is sturdy, compact, durable, simple, safe, efficient, versatile, and reliable, yet inexpensive and easy to manufacture, operate, and maintain.

The specific nature of the invention, as well as other objects, uses, and advantages thereof, will clearly appear from the following description and from the accompanying drawing, the different views of which are not necessarily to the same scale.

BRIEF DESCRIPTION OF THE DRAWING

FIG. 6 is a longitudinal sectional view of the unloading portion of the machine;

FIG. 7 is a top view partially cut away showing an alternative embodiment of the invention particularly adapted to fry chalupas;

FIG. 8 is a side elevational view partially cut away of the same embodiment;

FIG. 9 is a partial view taken in section along the line 9—9 of FIG. 8;

FIG. 10 is an enlarged detail taken on the line 10—10 of FIG. 7;

FIG. 11 is a partial detailed cross-sectional view taken substantially on the line 11—11 of FIG. 8;

FIG. 12 is a top view fo the clamping grid forming one carrier section of the product conveyor; and FIG. 13 is a side view of the supporting grid in a closed position.

DETAILED DESCRIPTION

Figure 3:
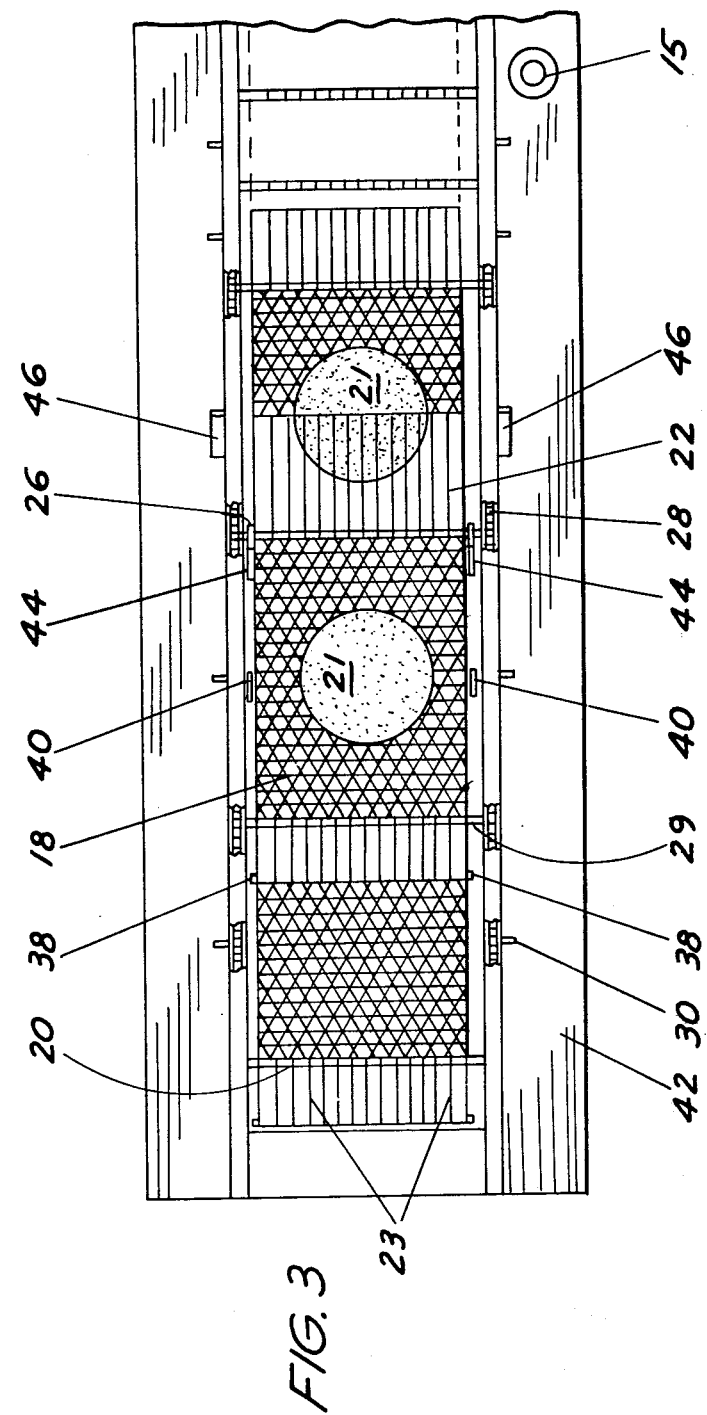
FIG. 3 is a top elevational view of the loading portion of the machine.
Figure 5:
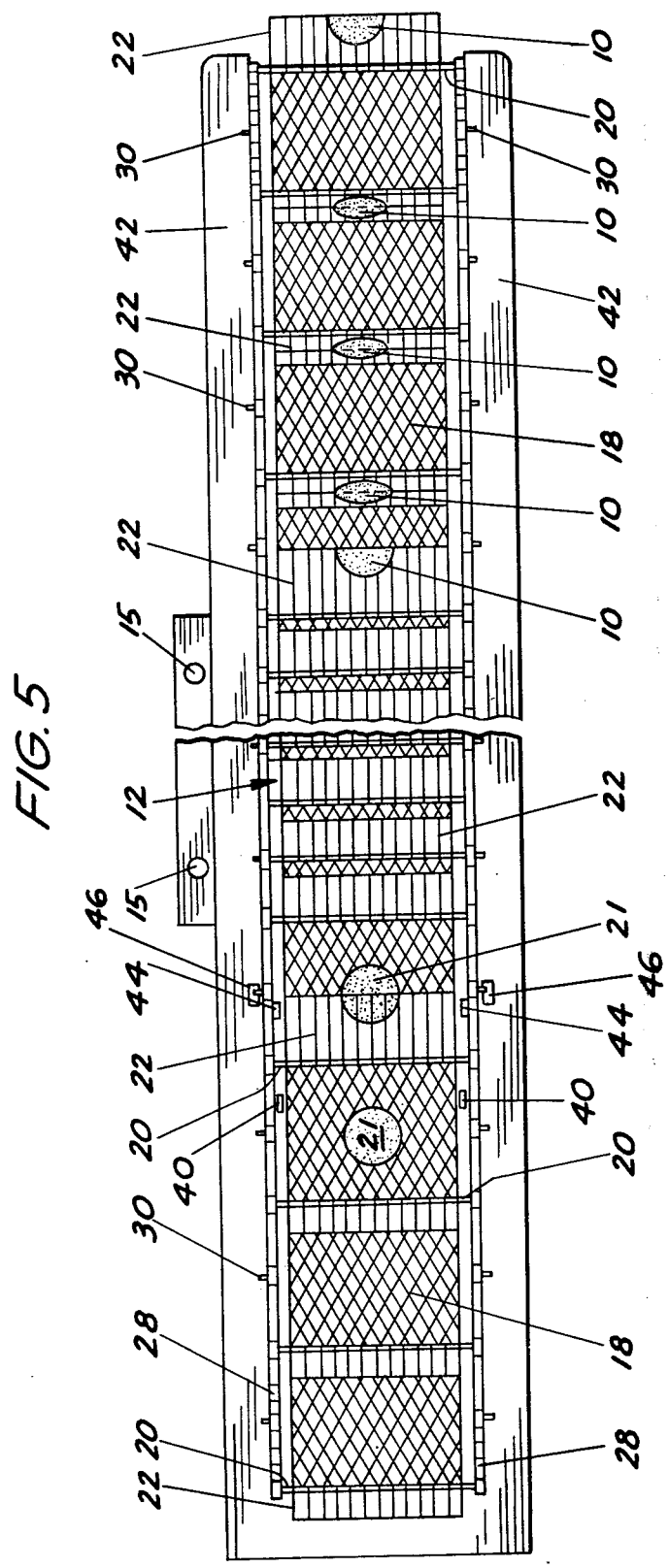
FIG. 5 is a top plan view of the entire machine.

The purpose of this machine is to produce a finished taco shell 10. The taco shell 10 is formed and then fried in vat 12 which contains hot grease or cooking fat heated by heat means 14. Inasmuch as the vat 12 is of conventional structure, it will not be described in detail. It is preferable to use three separate thermostats and submerged electric heaters as a portion of the heat means 14. The control dials 15 for the separate heaters are shown in FIGS. 3 and 5 of the drawing.

Figure 4:
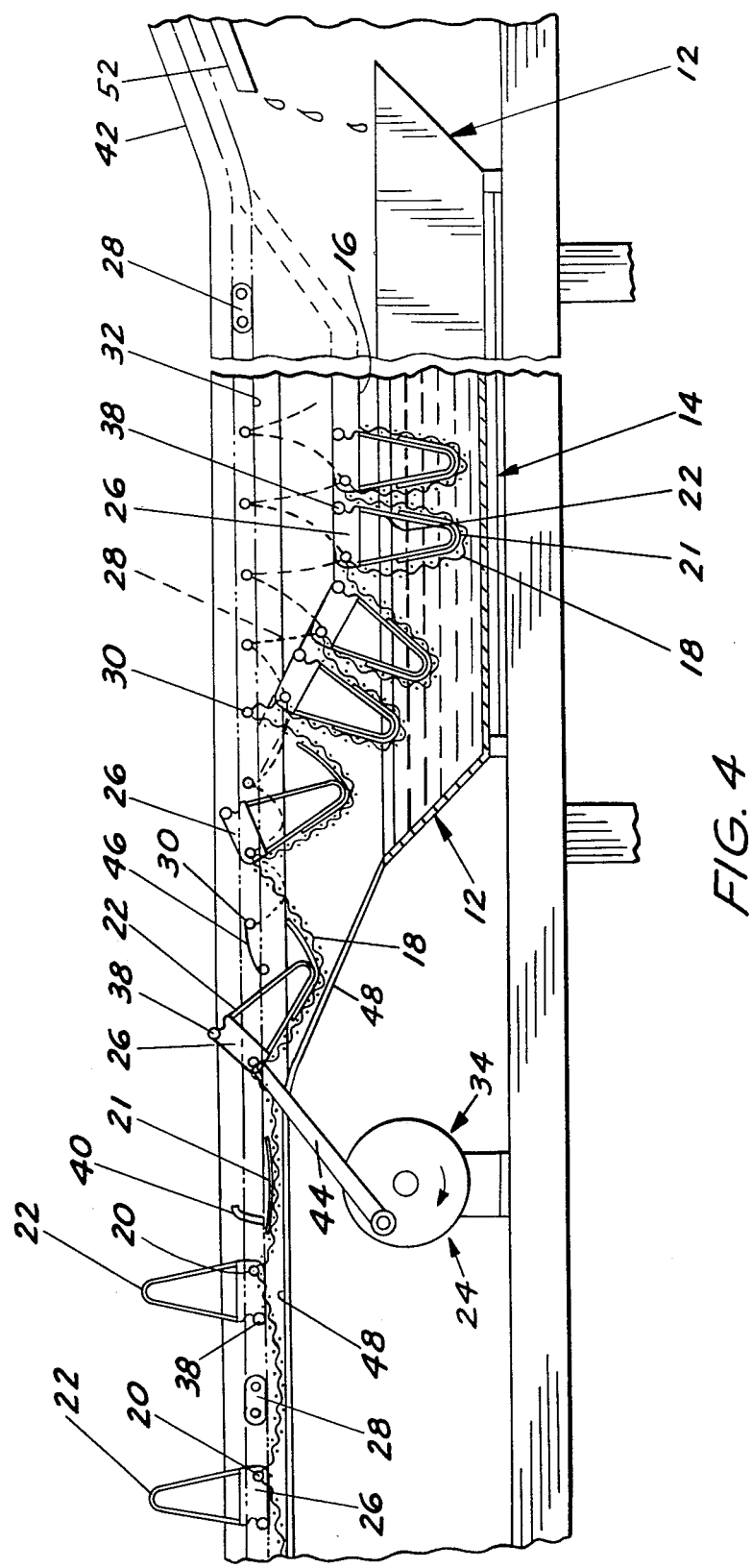
FIG. 4 is a sectional view of the loading and forming portion of the machine.

The vat 12 extends longitudinally. A first set of rails 16 (also called pivot rod rails) extend along each side of the vat 12 just above the level of the grease in the vat. (FIG. 4). The rails 16 support web 18 because the web has regularly spaced transverse pivot rods 20 across it. As stated before, the web 18 is made of woven wire and such woven web is known to the industry. It is a flexible wire mesh web. It could be described as a flexible, pliable continuous web, which is perforated, so the food, in this case tortilla 21, is cooked.

The pivot rods 20 also carry plungers 22. The plungers are V-shaped or U-shaped and are made of individual wire loops or V's 23 attached to a header 25 adjacent to the pivot rod 20 and a second bar or header 27 at the opposite end. The headers 25 and 27 are connected to cam plates 26 on each side which would be outboard of the web 18. The cam plates 26 are connected to the rods 20 as illustrated.

Drive chain 28 is connected to the extreme ends of the pivot rods 20. Describing this structure in a different way, it may be said that the pivot rods 20 have the drive chain 28 attached to the extreme ends thereof. Just inside of the connection of the drive chains 28, the pivot rods 20 have the cam plates 26 attached to them and the cam plates have attached thereto headers 25 and 27. The plunger loops 23, forming the plunger 22, are connected to the cam plates 26. Inside of the cam plates 26, the woven web 18 extends along the pivot rod 20. There is a space 29 between the cam plates 26 and the drive chain 28.

Chain pins 30 extend outward from the chain about halfway between where the chain is connected to the pivot rods 20. The chain pins 30, the drive chain 28, and the space 29 on the pivot rods 20, together with other equipment, all form drive means for driving the web and its associated equipment through the machine.

A second set of rails or chain rails 32 extend longitudinally along the vat 12 above and at a wider spacing than the first set of rails 16. The chain pins 30 ride upon the second set of rails 32.

Figure 2:
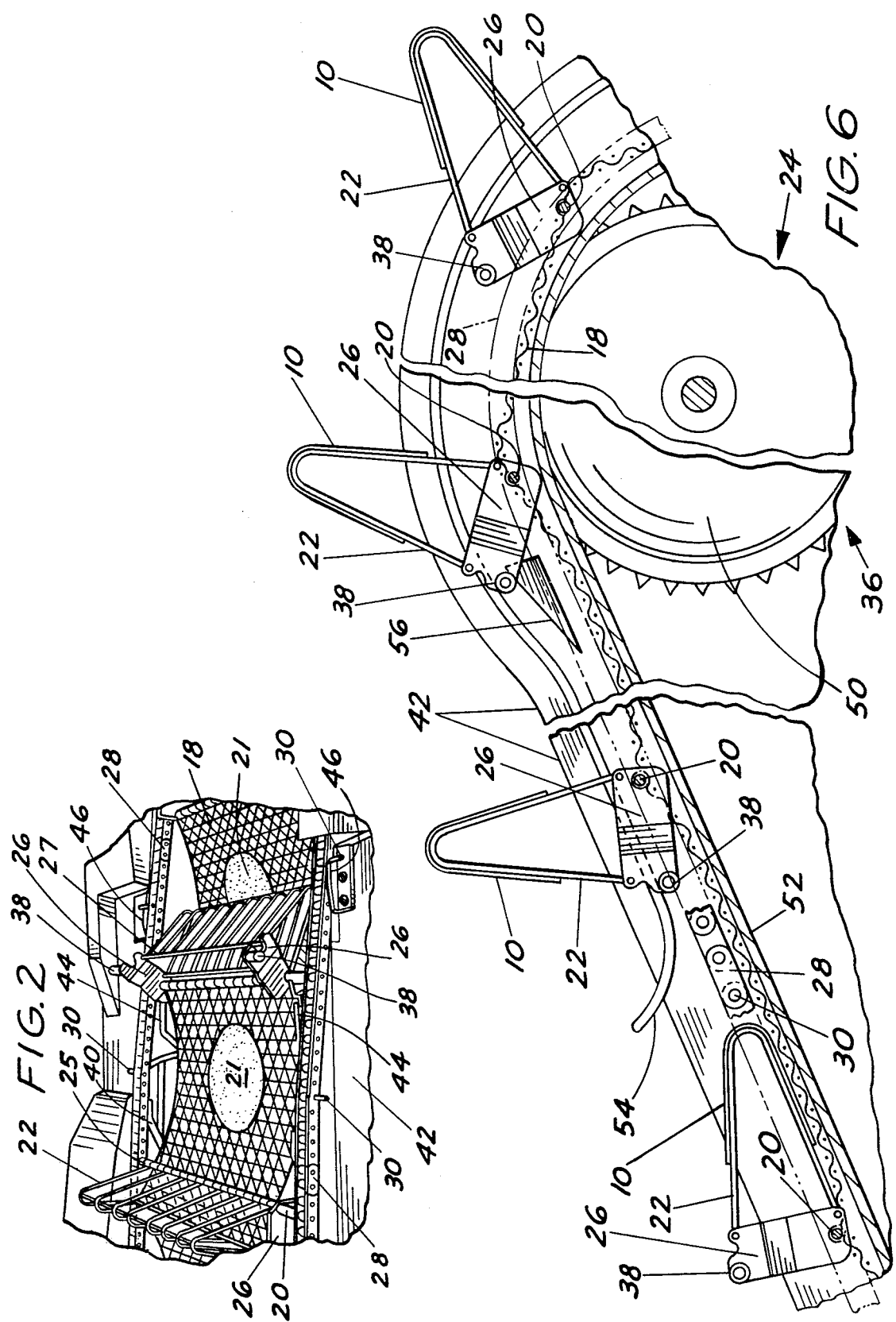
FIG. 2 is a perspective view of the loading portion of the machine.

The cam plates 26 carry a cam roller 38, the location of which may be particularly seen in FIGS. 2 and 6. As stated before, the pivot rod 20 is adjacent to the header 25 and, likewise, the cam rollers 38 are adjacent to the header 27, which is on the opposite end of the cam plate 26. The distance along the drive chain 28, or the web 18, from one pivot rod 20 to the next is a little over twice the height of the plunger 22. Also, the plunger 2 is a little over twice the length of the cam plate 26.

The basic operation of the machine may be described briefly and basically in that the tortilla 21 is placed on the web 18 and the plunger 22 holds the tortilla in place and forms the shape of the tortilla as the web is folded. Describing this process in more detail, the tortilla 21 is placed upon the web about halfway between pivot rods 20. (FIGS. 2, 3, and 5). Although it is stated that it is placed upon the web by hand, it is contemplated that an automatic mechanism for placing the tortilla is to be developed. However this is another invention. After the tortilla 21 is placed upon the web 18, the web is advanced. As the web is advanced, the plunger 22 is moved from its erect position to a horizontal position by spring recliner cam 40. (FIGS. 1, 2, 3, 4, and 5). The recliner cam 40 is placed upon rail 42 which extends along the machine adjacent to and at the loading station. The recliner cam 40 is placed to strike cam roller 38 to lift the cam roller 38, which is on the trailing side of the cam plate 26, so the recliner cam 40 pushes the trailing side upward which causes the plunger 22 to pivot forward upon the pivot rod 20. The tortilla 21 should be placed upon the web 18 so the end of the plunger 22 is about the center of the tortilla when the plunger 22 is in the down position.

The web 18 at the loading station is moved by push-drive means 34. The push-drive means is a portion of the total drive means 24. It includes a pair of arms 44 which are reciprocated by any convenient mechanism so that the web is advanced one step. The arms 44 push against the portion 29 of the rod 20 between the web 18 and the chain 28. The length of the step will be the distance from one pivot rod 20 to the next. The arms 44 have a notch which engages the space 29 upon the pivot rods 20.

Push catch 46 also is mounted upon the rail 42. However, the push catch is located at wider spacing so it is adaptable to engage the chain pin 30. Because the push catch 46 engages the chain pin 30, it is impossible for the web 18 to move backward and must always move forward. The web 18 is supported at the loading station by support plate 48. This support plate 48 slopes downward on the vat side of the loading station so it leads the web 18 into the vat 12. The web 18 has sufficient length so it is capable of folding as it proceeds through the vat 12. As the web is advanced by the push drive means 34, the web will fold. The first set of rails or pivot rod rails 16 will support the pivot rods and the cam rollers 38. The plunger 22 is now in a depending position emerged in the hot grease in the vat 12 and therefore the tortilla begins frying into a taco shell 10. The drive chain 28 is supported by the chain pins 30 on rail 32 above the level of rail 16 so the drive chain is not emerged in the hot grease. Although it does no damage for the drive chain 28 to be emerged in the hot grease, the drive chain would, of necessity, be heated to the temperature of the hot grease and after it came out, it would cool; therefore, it would require additional heat to heat the cooled drive chain.

The web 18 with the plungers 22 and the cam plates 26 are pushed through the vat 12 by the push drive means 34. The web 18 is pushed from the loading station to the vat.

On the unloading end of the vat 12, the web 18 is pulled from the vat by the pull drive means 36. This pull drive means 36 includes a sprocket 50 which is mounted at the top of the drain incline 52. The two drive chains 28 are trained over the sprockets 50. As the drive chains 28 are pulled by the sprocket 50 at the top of the drain incline, the web 18 is also pulled because the web and drive drive chain are interconnected by the pivot rods 20. As the web 18 is pulled, it straightens and unfolds. The taco shells 10 have now been fried crisp after having passed through the hot grease in the vat 12. The plungers 22 will by lying along the web.

After the plungers with the taco shells on them have been pulled from the vat, the plunger will be erected by erector cam 54 which is mounted upon the side rails of the machine at this area. The erector cams 54 are flat springs which act upon the cam rollers to pivot the cam plates 26 and thus the plungers 22 in a vertical upright position so the grease readily drains from the taco shell. The grease runs from the taco shell along the drain incline 52 and back into the vat 12. Various roughness or additional shaker cams 56 are placed along the sides of the drain incline so the plungers are shaken or flipped, causing the grease to shake off the taco shells 10.

It will be understood that at the end of the run, taco shells 10 fall freely from the plungers 22. It is possible, also, to put additional cams similar to cams 56 to give a little flip to the plunger at the point the shell 10 is flipped from the plunger 22.

Those skilled in the art will understand that if it is desired that the tortilla be fried flat, (e.g., chalupa), a slightly smaller tortilla is placed immediately adjacent to the pivot rods 20 and the plunger 22 will hold them against one of the flat sides rather than bending them in the middle as shown in this embodiment.

After the web, plungers, etc., are pulled from the grease and the taco shells 10 are flipped from the plungers, the web and chain are returned back beneath the vat 12 to the loading station where the process is repeated.

From the above description for cooking taco shells, chalupas, and the like, it is clear that this invention provides an improved method for cooking a relatively large amount of product in a relatively small amount of grease. This is possible because a major portion of the respective surface area of each product is substantially parallel to a respective flat plane. For example, the major flat plane which bisects the small angle formed by the opposing faces of the cooked taco shells is substantially parallel to those opposing faces. With a chalupa, the flat plane is substantially the same as the major plane of the fried flat tortilla.

Figure 1:
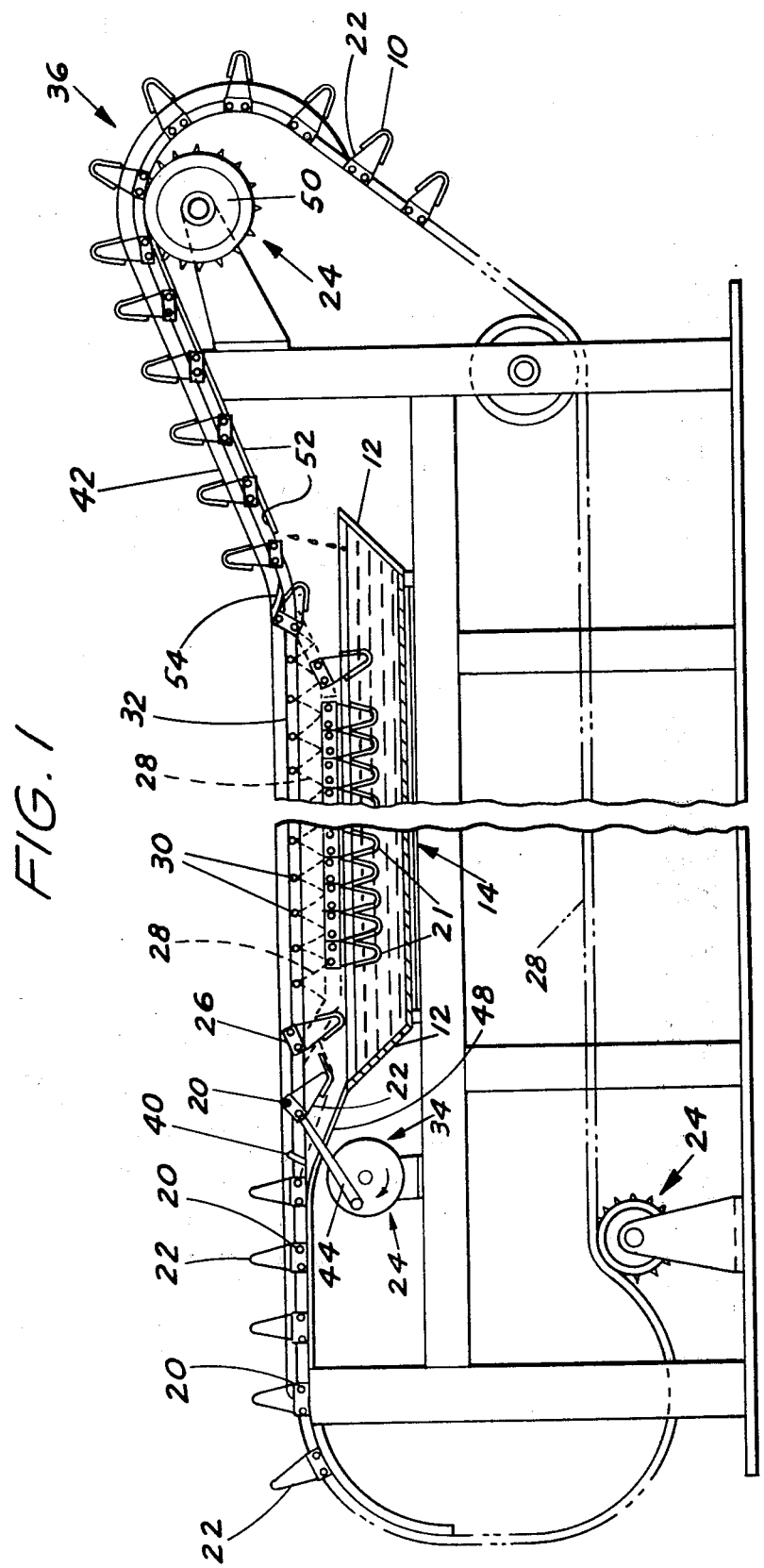
FIG. 1 is a longitudinal schematic sectional view of a machine according to this invention.

Referring to FIG. 1, the products to be cooked are disposed in the hot grease side by side with their respective flat planes, which are substantially parallel to a major portion of their surface area, in line with and extending transversely to a substantially horizontal line which passes through the grease. The products are then moved through the grease along the direction of the horizontal line, resulting in a maximum amount of food product in a minimum amount of grease.

For those food products such as taco shells and chalupas which are held in the desired shape on carriers during the cooking operation, the carriers are spaced apart prior to loading with the food product to be cooked. After loading, the carriers are moved together, and advanced through the grease in the more closely spaced orientation to achieve maximum food product in a minimum amount of grease. The loaded carriers are moved from the grease and separated to permit the products to be removed from the spaced-apart carriers.

The drive mechanisms have not been shown nor have they been described in detail. Anyone skilled in the art can provide a mechanism for driving the pull drive means 36 at a constant rate of speed and operate the push drive means 34 so it pushes in a reciprocating motion. Of course, these two drive means 34 and 36 must be timed so the total of the motion of the two is the same. However, because the push drive means 34 is discontinuous, it is necessary that there be a loop in the web 18 and chain 28 somewhere in the return from the unloading station to the loading station. It is preferable to form this loop, which will vary in length, at the loading station end of the machine. Since the drives must be timed together, it is also preferable to use a single electric motor to drive, by chains, the push drive mechanism 34 and the pull drive mechanism 36. There is no particular lost motion between the pull drive mechanism 36 and the return chain beneath the vat, but at the loading end, there is more or less web and chain hanging. The amount hanging will vary according to what portion of the cycle the push mechanism is in.

Also, the push mechanism 34 could drive the chain 28 and web 18 continuously. However, this requires the tortillas 21 to be loaded onto a moving web which is not the preferred embodiment.

Other details of construction, such as side plates and framework, either have not been shown or only shown schematically inasmuch as anyone skilled in the art of building food machinery is able to provide these details of construction without experimentation or inventive effort.

Referring to FIGS. 7-13, an alternative embodiment particularly adapted to the frying of chalupas is disclosed. In this arrangement the product conveyor system for moving the tortillas through a vat 112 containing hot cooking oil or fat is made up of a plurality of tortilla carrier sections 114 linked together in an endless loop, each section, as best seen in FIG. 12, including a supporting grid 116 and a clamping grid 118. The supporting grid 116 is made up of a plurality of spaced parallel wires 119 welded to a pair of spaced cross stiffeners 120. The supporting grid 116 is attached along one margin to a carrier rod 122 which passes through eyes 124 formed in extensions of some of the grid wires 119. The clamping grid 118 similarly is made up of a plurality of spaced rods 125 welded to cross rods 126. The clamping grid 118 is joined to the supporting grid 116 by a hinge 128 which allows the supporting grid and clamping grid to move from V-shaped open positions to a folded closed position, as shown in FIG. 14. Spaced ones of the wire rods 125 are extended and bent under at an acute angle to form a leg 130 which terminates in an eye 131. One of the carrier rods 122 extends through the eyes 131, as well as through the eyes 124 of the supporting grid of an adjacent section 114, to link two sections together. Thus the carrier sections 114 are linked together into a continuous conveyor.

The outer ends of the rods 122 are secured respectively to a pair of carrier chains 132 and 134. Rollers 136 are journaled on the carrier rods 122 and operate to support and guide the conveyor along guide rails, as hereinafter described in detail.

Reffering to FIGS. 7 and 8, the conveyor is supported in the form of an endless loop within a supporting framework, indicated generally at 138. In the upper portion of the conveyor loop, the rods 122 extend between a pair of upper carrier support rails 140 and 142, the rollers 136 engaging the top surfaces of the upper tracks. As seen in FIG. 8, the tracks 140 and 142 have an arcuate section 148 which lifts the carrier sections over the right end of the vat 112 and down below the top of the vat. The tracks 140 and 142 then extend horizontally the length of the vat and incline upwardly out of the left end of the vat, as indicated at 150, where the tracks 140 and 142 terminate.

The return portion of the conveyor loop moves along a pair of lower horizontal tracks 152 on which the rollers 136 move to support the carrier sections below the vat 112. In moving between the upper and lower tracks, the product carrier sections 114 of the conveyor are supported from the chains 132 and 134. At the right end of the lower tracks 152, the carrier chains pass over guide sprockets 154 and around a pair of carrier chain drive sprockets 156. The drive sprockets are driven from a motor and gear reducer unit 158 through a chain drive that includes a first drive chain 160. As best shown in FIGS. 8 and 9, the chain 160 extends around a sprocket 162 on a jack shaft 164. The jack shaft 164 in turn is coupled to the drive sprockets 156 through a second drive chain 166. Rotation of the drive sprockets 156 pulls the chains 132 and 134 of the conveyor past a pair of drag sprockets 168 and 170 at the point where the carrier rods 122 of the conveyor leave the ends of the inclined section 150 of the upper tracks 140 and 142. The drag sprockets, which are supported on a drag shaft 172 journaled at either end in bearings 174 and 176, has an adjustable friction clutch 178 mounted thereon which frictionally engages a drag plate 179. The drag clutch resists the rotation of the drag shaft 172 by the drive chains 140 and 142. Thus a tension is applied to the drive chains 132 and 134 between the drag sprockets 168 and 170 and the drive sprockets 156. Between the drag sprockets and the guide sprockets 154, the drive chains 132 and 134 pass around slide disks 180 and 182 and then pass over idler sprockets 184 and 186.

In moving from the drag sprockets 168 and around the drive sprockets 156, the carrier chains 132 and 134 are in tension which causes the carrier sections 114 to be in the open condition. When passing through the vat 112 the carrier sections must be in the closed condition shown in FIG. 13 in which the tortillas are clamped to hold them flat during the frying operation. The closing of the carrier section allows them to be bunched in closely packed association as they move through the cooking oil, thus greatly reducing the required volume of the cooking oil in the vat. The manner in which the carrier sections 114 are moved to the closed position before entering the vat 112 will now be described.

To provide support for the conveyor between the sprocket drive 156 and the upper tracks 140 and 142, the carrier chains 132 and 134 engage the outer edge of a pair of chain guide members 192 having an arcuate section 194 terminating in a slightly inclined tangent section 196. The tangent sections 196 terminate in overlapping relationship with the ends of the upper carrier tracks 140 and 142. As shown in FIG. 7, the overlapping ends of the tracks are joined to the inside of the chain guide members 192 by spacer lugs 200.

To move the conveyor along the arcuate guide members 192, a pair of pusher chains 202 and 204 are provided which are driven by sprockets 206 on the jack shaft 164, as best seen in FIG. 9. Referring to FIG. 8, the pusher chain 202 passes from the sprocket 206 around an adjustable idler sprocket 208 and engages the outer edge of a guide member 210 which has an arcuate section having the same center of radius as the arcuate section of guide members 192. As shown in FIG. 7, the guide member 210 and guide member 192 are secured in closely spaced parallel relationship by spacers 212. The guide members 210 terminate in steeply inclined sections 218 which guide and support the pusher chain back to the sprockets 206 on the jack shaft 164.

The pusher chains 202 and 204 are provided with spaced pusher lugs 220 which project radially outwardly from the pusher chains. The lugs 220 are spaced a linear distance along the chain approximately equivalent to the linear distance between pairs of carrier rods 122 in the conveyor when the carrier sections are in the open position. Thus as the pusher chains move along the guide members 210, one of the projecting lugs 200 on each chain comes into engagement with one of the rollers 136 thereby pushing the associated carrier rod 122 and the carrier chains 132 and 134 upwardly around the respective guide members 192. The linear speed of the pusher chains 202 is substantially the same as the linear speed of the carrier chains coming off the sprockets 156.

As the carrier rods 122 reach the top of the arc and start down the incline portion 196 of the guide members 192, the lug 220 disengages from the rollers 136 and starts down the steeply inclined section 218. At this point the carrier section 114 has been folded to the closed condition because there is no force continuing to push the conveyor down the incline sections 196. As each carrier section collapses and stops, the carrier section behind is being pushed around the arcuate section of the guide members by the preceding lug on the pusher chain. This lug forces the carrier section to collapse as it is pushed toward the collapsed carrier section now resting on the incline 196 at the point where the lug 220 disengages from the roller 136. Once a carrier section is collapsed, it must be pushed ahead down the incline 196 to the point where the pushing lug 220 can disengage and start down the incline 218. Thus there is a continuous action taking place in which successive lugs 220 push successive carrier sections into a collapsed condition and past the point where the lugs disengage with the rollers 136.

Once the carrier sections 114 are collapsed by this action, the rods 122 are much more closely spaced by a distance fixed by the length of the legs 130. Furthermore the acute angle between the legs 130 and the clamping grid 118 causes the clamping grid and the supporting grid when in the closed position to extend forward at an acute angle to the path of movement of the conveyor along the tracks. This causes the collapsed carrier sections 114 to assume a closely nested position in which the lower hinged margin of the grids leads the carrier section through the vat. The oil is scooped upwardly by the tortilla to insure complete frying even with a low level of oil in the vat. As each additional pair of collapsed carrier sections are added to the incline sections 196, all the accumulated closed carrier sections are advanced along the tracks 140 and 142 through the cooking vat 112. The motion of the closed carrier sections 114 through the cooking oil vat is therefore intermittent, the conveyor moving through the vat in increments as each additional closed carrier section is closed and pushed onto the incline section by the moving pusher lugs 220.

The carrier chains are provided with a plurality of pins 190 which project outwardly away from the carrier sections. The pins 190 are parallel to the carrier rods 122, one of the pins being located substantially midway between each pair of adjacent carrier rods. At the same time that the carrier sections are being collapsed and pushed on to the incline sections 196, the pins 190 come into engagement with a pair of upper rails 222 and 224. These upper rails have an inclined section 226 which is initially engaged by the pins 190. As the pins 190 ride up the incline 226, the associated carrier chains 132 and 134 are deflected upwardly. Thus the slack formed in the carrier chains with the closing of the carrier sections 114 is taken up by the lifting of the pins 190. Hold-down arms 228 are mounted to the frame and extend directly above the path of the rollers 136 to keep the rods 122 moving in a fixed path as the chains are lifted by the pins 190. The upper rails 222 and 224 continue above the vat 112 and terminate opposite the incline section 150 of the tracks 140 and 142 where the carrier sections are moved up out of the vat of cooking oil. The increased tension in the carrier chains as the carrier sections are moved up the inclined section 150 of the tracks results in the opening up of the carrier sections as they leave the cooking oil vat 112.

WHAT IS CLAIMED IS:

1. Cooking apparatus comprising:
   a plurality of foldable product carrier sections linked together at opposite margins to form a continuous closed loop, each carrier section being collapsible from a substantially open condition to a closed condition by moving the linked margins of each section together,
   an elongated shallow vat adapted to hold hot cooking fat,
   guide means directing the linked carrier sections successively in a path along the length of the vat, and means positioned adjacent one end of the vat for pushing each of the sections in succession toward the vat along the guide means, said pushing means including means for urging one linked margin of each section toward the other linked margin to close each carrier section as it advances toward the vat, the carrier sections advancing under the urging of the pushing means along the length of the vat in the closed condition.

2. Apparatus of claim 1 further including return guide means for directing the linked loop of carrier sections in a return path, said return guide means including a portion extending upwardly to the end of the vat remote from the pushing means, drive means for pulling the carrier sections upwardly from the vat along said upwardly extending portion of the return guide means, the pulling action of the drive means opening the carrier sections as they move upwardly along said portion of the return guide means.

3. Apparatus of claim 2 wherein the carrier sections include a flexible metal grid.

4. Apparatus of claim 2 wherein the carrier sections include a pair of rigid metal grids and hinge means joining the two grids together, the hinge means having a pivot axis extending transverse to the direction of movement of the carrier sections along said guide means.

5. Apparatus of claim 4 further including means tilting said pair of grids when the carrier section is in the closed position, said means tilting the grids in a direction such that the hinge means leads the linked margins of the associated carrier section as the section is moved lenthwise of the vat.

6. Apparatus of claim 1 wherein the pushing means includes means successively engaging the carrier sections adjacent the linked margins of each pair of adjacent carrier sections, the engaging means remaining in a engagement a predetermined distance along said guide means greater than the length of one carrier section.

7. Apparatus comprising a moving product conveyor including a plurality of carrier sections linked together in an endless loop, each carrier section including a pair of flat rigid grids hinged together with the hinge axis extending transverse to the direction of movement of the conveyor, whereby the grids can pivot between an open condition and a closed product clamping condition, and support members projecting from either side of the conveyor at the junctions between the linked sections, guide means engaged by the support members for guiding the product conveyor along a predetermined path, and drive means positioned at a first position along the guide means and engaging the support members for pushing the support members along the guide means, the drive means including a plurality of spaced lugs and means moving the lugs along a predetermined path that brings the lugs successively into and out of contact with the support members, each moving lug on coming into contact with a support member pushing the support member along said guide means toward the adjacent preceding support member of the conveyor, whereby the lugs push the support members together ahead of the lugs to close the hinged carrier sections.

8. Apparatus of claim 7 wherein the lug moving means moves said lugs in one direction around a predetermined path, the lugs being equally spaced along said path at intervals corresponding to the distance between successive support members of the conveyor, said path extending parallel to the guide path for a distance in excess of twice the distance between adjacent lugs, whereby at lease two moving lugs are always in contact with support members of the conveyor at any given time.

9. Apparatus of claim 7 wherein the pair of grid members of each section are unequal in width as measured from the hinge axis between the two grid members and the junction with the adjoining carrier sections.

10. Apparatus of claim 9 further including means applying hot grease to carrier sections as they are pushed along the guide means from said first position toward the second position.

11. Apparatus of claim 7 further including drive means positioned adjacent a second position along the guide means for applying tension to the product conveyor, the tension pulling the hinged grids of carrier sections to the open condition at said second position.

12. Cooking apparatus comprising a plurality of product carriers, each carrier having a respective major surface, means linking the carriers together in a continuous closed loop conveyor, a container adapted to hold hot cooking oil, means for movably supporting the carriers in the hot cooking oil with their respective major surfaces substantially parallel to each other and transverse to a substantially horizontal line extending through the cooking oil, and means for moving the carriers into, through, and out of the hot cooking oil along the direction of the horizontal line.

13. Apparatus of claim 12 wherein each of the product carriers is foldable from an open position to a closed position in the direction of movement of the conveyor, means pushing the carriers closer together to close the carriers as they are moved into the hot cooking oil, and means pulling the carriers apart to open the carriers as they move out of the hot cooking oil.

14. A taco frying machine comprising a closed loop conveyor including a plurality of grid sections, and hinge means linking the sections together, a vat of cooking oil, means moving the conveyor through the cooking oil, means collapsing the conveyor to fold adjacent hinged sections together in accordion fashion as the conveyor moves into the vat, and means stretching the conveyor to pull the adjacent hinged sections apart as the conveyor moves out of the vat.

* * * * *